United States Patent [19]

Cordes et al.

[11] 4,172,069

[45] Oct. 23, 1979

[54] STABILIZATION OF POLYAMIDES

[75] Inventors: Claus Cordes, Weisenheim; Peter Horn, Hirschberg; Hans-Peter Weiss, Altrip; Herbert Gutsche, Beindersheim, all of Fed. Rep. of Germany

[73] Assignee: BASF Aktiengesellschaft, Fed. Rep. of Germany

[21] Appl. No.: 833,064

[22] Filed: Sep. 14, 1977

[30] Foreign Application Priority Data

Sep. 25, 1976 [DE] Fed. Rep. of Germany ....... 2643204

[51] Int. Cl.$^2$ ................................................ C08K 3/16
[52] U.S. Cl. ......................... 260/45.75 C; 260/45.7 R; 260/45.75 W
[58] Field of Search ............... 260/45.75 C, 45.75 W, 260/45.7 R

[56] References Cited

U.S. PATENT DOCUMENTS

| | | | |
|---|---|---|---|
| 2,705,227 | 3/1955 | Stamatoff | 260/45.7 C |
| 3,519,595 | 7/1970 | Hermann et al. | 260/45.75 C |

*Primary Examiner*—V. P. Hoke
*Attorney, Agent, or Firm*—Keil & Witherspoon

[57] ABSTRACT

Thermoplastic nylons are stabilized with copper compounds and synergistic halides by incorporation of from 0.1 to 10% of a concentrate of nylon, copper bromide or iodide and calcium bromide, zinc bromide or magnesium bromide. The stabilized nylons may be thermoplastically processed to give semimanufactures or films.

9 Claims, No Drawings

STABILIZATION OF POLYAMIDES

The stabilization of nylons against the effect of light and heat, by means of copper halides alone or in combination with other compounds has been disclosed. For example, according to Belgian Pat. No. 605,102 mixtures of copper iodide and an alkali metal iodide are used as stabilizers for nylons.

German Laid-Open Application DOS No. 2,254,408 discloses a four-component stabilizer system for nylon which in addition to a copper halide contains an alkali metal halide or alkaline earth metal halide, as well as an organic phosphine and a phenolic compound.

A conventional method for incorporating stabilizers into nylons is to coat the nylon granules with the solid stabilizer system in a drum mixer and then to process the granules as described, for example, in Kunststoff-Handbuch, volume VI, Polyamide, Hanser-Verlag, Munich, 1966. However, it is a disadvantage of this process that because of the poor solubility and low rate of solution, constant and reproducibly optimized distribution of the stabilizer system cannot be relied on. This greatly detracts from the stability. Furthermore, it adversely affects the electrical breakdown resistance. The stabilized compositions may also show severe color variations.

It is a further disadvantage that a separate melting process has to be interpolated between the polymerization and the molding process, in order to introduce the stabilizer system. This melting process is not only expensive but also causes degradation of the polymers which, especially in the case of high molecular weight nylons which are used preferentially for the extrusion of films and sheeting, results in a lowering of the viscosity and a deterioration of the processing properties and performance characteristics.

It is an object of the present invention to avoid the above disadvantages. It is a further object of the invention, in particular, to stabilize high molecular weight nylons for extrusion to give films and semi-manufactures. It is a further object of the invention to stabilize nylons very effectively without undesirable toxic effects.

We have found that these objects are achieved, according to the invention, by stabilizing nylon with a solid, homogeneous concentrate of copper-(I) bromide or copper-(I) iodide and calcium bromide, zinc bromide or magnesium bromide in a nylon.

Accordingly, the invention relates to a process for stabilizing thermoplastic nylons with copper compounds, in which there is incorporated, into a thermoplastic nylon A having a K value, measured by the Fikentscher method, of more than 65, from 0.1 to 10% by weight, based on the nylon A, of a homogeneous concentrate of from 68 to 97.9% by weight of a nylon B having a K value of from 60 to 85, from 0.1 to 2% by weight of copper-(I) bromide or copper-(I) iodide and from 2 to 30% by weight of calcium bromide, zinc bromide or magnesium bromide.

Preferably, the stabilized thermoplastic nylon contains from 10 to 200 ppm of copper, based on the nylon. The added calcium bromide, zinc bromide or magnesium bromide not only has a synergistic effect on the stabilizing action of the copper but at the same time reduces the undesirable discoloration of the nylon which the copper may cause. In contrast to the conventional alkali metal iodides used as synergistic agents, the bromides employed according to the invention are non-toxic in the stated amounts.

The invention further relates to stabilized thermoplastic nylons which contain from 10 to 200 ppm of copper in the form of copper bromide and from 0.02 to 1.0% by weight of calcium bromide as a synergistic agent.

Whilst, as stated above, directly produced mixtures of nylon with the conventional stabilizer systems, at the low concentrations conventionally used in practice, are not homogeneous, concentrates which contain the stabilizer system in the amounts according to the invention are, surprisingly, homogeneous, i.e. they are single-phase, solid solutions which are clear and transparent.

The nylon A to be stabilized has a K value greater than 65 and preferably from 70 to 95. For use in the manufacture of films, nylons with K values greater than 80 are employed; for other fields of use, the viscosities may be lower. Preferably, the nylon A is nylon 6 or nylon 6,6; however, polylauryl-lactam or polyaminoundecanoic acid may also be employed, as may nylons synthesized from, for example, hexamethylenediamine and sebacic acid, azelaic acid or dodecanedicarboxylic acid.

The nylon A and nylon B may be identical or different. The K value of nylon B is from 60 to 85, preferably from 65 to 75. The use of poly-$\epsilon$-caprolactam is preferred, but nylon copolymers of $\epsilon$-caprolactam with lauryl-lactam or aminoundecanoic acid or with salts of hexamethylenediamine and adipic acid, sebacic acid, azelaic acid or dodecanedicarboxylic acid may also be used.

The nylon B is preferably melted at from 200° to 300° C. The additives may be admixed by means of conventional stirring and mixing equipment. The use of single-screw of twin-screw mixing extruders is preferred. It has proved advantageous to comminute and mill the additives before they are admixed. The concentration of copper-(I) iodide or copper-(I) bromide in the concentrate is from 0.1 to 2% by weight, preferably from 0.2 to 1% by weight. Mixtures of copper-(I) iodide and copper-(I) bromide may also be used.

The concentration of calcium bromide, zinc bromide or magnesium bromide in the concentrate is from 2 to 30, preferably from 3 to 15, % by weight. Mixtures of the individual bromides may also be used. In an embodiment which is particularly preferred because of its non-toxicity, copper-(I) bromide and calcium bromide are used. It is at times advantageous to incorporate other additives, e.g. nucleating agents, lubricants and mold release agents, as well as other stabilizers, into the concentrate, in addition to the additives of the invention. For example, it has proved advantageous to add low molecular weight aliphatic amides or esters of 5 to 25 carbon atoms per amide or ester group, e.g. N,N'-distearylethylenediamine, as processing assistants. For the manufacture of stabilized films, in particular, it is advantageous to add from 0.01 to 1% by weight of very finely divided talc. After admixture of the additives of the invention to the melt, the latter can, for example, be extruded to give strands, which are cooled and granulated.

In a preferred embodiment which is used, above all, for the manufacture of films or monofilaments, the melt viscosity of the concentrate is about the same as the melt viscosity of the nylon A. It is advantageous if the viscosities differ by less than 1,000, preferably less than 300, poise.

To stabilize the thermoplastic nylon A, the latter is mixed with the solid stabilizer concentrate; this can be done on conventional mixing equipment by melting and adequate subsequent mixing. It is advantageous to use, for example, mixing extruders. The ratio of nylon A to stabilizer concentrate depends on the mixing action of the equipment used, on the desired stabilization and on the stabilizer concentration in the concentrate. We have found that particularly good results are obtained if from 0.1 to 10, preferably from 0.5 to 5, % by weight of concentrate are added to the nylon A.

The stabilized nylon A may contain up to 60% by weight of conventional fillers and reinforcing agents, e.g. glass fibers, glass beads, talc, mica, chalk and other additives which may be fibrous, flaky or of other forms. In addition, the nylon A may be modified with up to 15% by weight of other polymers, e.g. polyethylene, polyesters or elastomeric polymers. The above additives may be worked into the nylon simultaneously with the stabilizer concentrate, with or without addition of pigments, processing assistants and the like.

In a preferred embodiment of the invention, the admixture of the stabilizer concentrate to the nylon A which is to be stabilized, and the process of melting for thermoplastic processing, e.g. for injection molding, monofilament or film extrusion or thermoplastic manufacture of profiles, is carried out in a single step. In that case, the starting material is advantageously a mixture of granulated nylon A and granulated solid stabilizer concentrate.

The said embodiment of the process of the invention is in particular suitable for the manufacture of heat-stabilized nylon films by slit die extrusion or by film blowing, to give films which are up to 200 μm thick, for example for foodstuff packaging.

It is an essential advantage of the process of the invention that the inadequacies and difficulties resulting from the poor solubility and difficulty of dispersing the conventional stabilizer systems in nylon are avoided. The concentrate solutions obtained according to the invention which are, surprisingly, homogeneous, disperse exceptionally well in nylons.

It is, therefore, an advantage of the process according to the invention that nylon moldings having good heat stability can be produced reproducibly, and with a constant intrinsic color. It is thus possible, using toxicologically safe stabilizer additives, to manufacture moldings, especially films for packaging, for example, foodstuffs, which have very great heat stability, without the process entailing a step which reduces the viscosity of the material. Films manufactured by the process of the invention possess a good intrinsic color and high transparency and are, in particular, free from specks. It is a further advantage that the nylon can be stabilized with a minimum amount of copper ions in the nylon.

A further essential advantage of the mixture to be added according to the invention is that the concentrate can be stored, and transported, for indefinite periods. For this reason it is universally suitable for stabilizing nylons. For example, it may be added to the nylon molding compositions, with or without color additives, fillers and the like, before processing. It can also be added directly to the nylons, when these are processed further, prior to the manufacture of injection moldings and films.

In the Examples, parts and percentages are by weight. The K values, obtained by the method of Fikentscher, Cellulosechemie 13, (1932), 58, were measured on 0.5% strength solutions in 96% strength sulfuric acid.

EXAMPLE 1

Manufacture of a stabilizer concentrate 3,630 parts of nylon 6 granules having a K value of 71 were mixed with 336 parts (=8.4%) of calcium bromide powder and 35 parts (=0.975%) of copper-(I) bromide in a mixer at room temperature. The mixture was then fused in an extruder at 260° C. and extruded at a throughput of 30 kg/h. The melt was converted to strands which were granulated, and the granules were dried under reduced pressure at 50° C.

The product is a homogeneous solid solution, as can be shown by the fact that completely transparent articles are obtained on injection molding. Analysis shows the presence of 0.385% of Cu and 7.25% of Br.

EXAMPLE 2

100 parts of nylon 6,6 granules having a K value of 72 were mixed with 2 parts of the concentrate of Example 1 in a mixer. The viscosity of the nylon and of the concentrate differ by less than 200 poise. Standard bars according to DIN 53,453 were injection-molded from the granule mixture. The analytically determined Cu content of the bars was 77 ppm. To test the heat stabilization, the notched impact strength was measured on the said bars. The bars, of size 4×6×50 mm, were provided with a central hole of 3 mm diameter and kept at 140° C. in air.

At certain intervals, 10 specimens per material sample were taken and the notched impact strength was determined by the method described in "Kunststoff" 57 (1967), 825–828.

EXAMPLE 3 (Comparative experiment)

Nylon 6,6 having a K value of 72 was injection-molded as described in Example 2, but without the additive of the invention, to give standard bars according to DIN 53,453. These were tested as described in Example 2.

EXAMPLE 4 (Comparison with the prior art)

100 parts of a nylon 6,6 having a K value of 72, 0.0175 part of copper-(I) bromide and 0.2 part of potassium bromide were mixed in a mixer. Standard bars were injection-molded from the mixture by the method described in Example 2 and were tested accordingly. The analytically determined Cu content of the bars was 77 ppm. Results of the measurements in Examples 2, 3 and 4.

| Example | Notched impact strength (KJ/m²) after | | | | | | |
|---|---|---|---|---|---|---|---|
| | 0 | 3 | 10 | 20 | 30 | 40 | 50 days |
| 2 | 64 | 65 | 61 | 61 | 46 | 37 | 37 |
| 3 | 68 | 6.5 | 4.1 | — | — | — | — |
| 4 | 65 | 61 | 55 | 40 | 23 | 16 | 7.5 |

EXAMPLE 5

(a) Blown films from 18 to 20 μm thick were produced on a single-screw extruder (barrel diameter 60 mm, length:diameter ratio 24:1, die gap 1 mm) at 280° C. The starting material used was a granule mixture of 98 parts of nylon 6,6 having a K value of 91.5 and 2 parts of the concentrate as described in Example 1.

(b) For comparison, blown films were produced without addition of the concentrate.

The heat stability of the films produced was tested by storing them at 200° C. and then carrying out a tensile test in accordance with DIN 53,455. A visual assessment of the optical quality of the film was also made. Results:

| Visual assessment of the film | Tensile test according to DIN 53,455, elongation at break after storage at 200° C. for | | |
|---|---|---|---|
| | 0 | 1 | 2 (hours) |
| (a) very good | 300 | 247 | 233 |
| (b) as for (a) | 300 | not measureable | material destroyed |

We claim:

1. A process for stabilizing a thermoplastic polyamide which comprises: incorporating into a thermoplastic polyamide A having a K value (measured by the Fikentscher method) of more than 65, from 0.1 to 10% by weight, based on the polyamide A, of a homogeneous concentrate of (a) from 68 to 97.9% by weight of a polyamide B having a K value of from 60 to 85, (b) from 0.1 to 2% by weight of copper-(I) bromide and (c) from 2 to 30% by weight of calcium bromide, the percentages being based on the weight of the concentrate.

2. A process as set forth in claim 1, in which the polyamide A to be stabilized is polycaproamide or polyhexamethylene adipamide having a K value of from 70 to 95.

3. A process as set forth in claim 1, wherein the polyamide B is poly-ε-caprolactam or polyamide copolymer which contains a major proportion by weight of cocondensed ε-caprolactam.

4. A process as set forth in claim 1, wherein the homogeneous concentrate has been manufactured by melting the polyamide B at from 200 to 300° C. and mixing it with the copper-(I) compound and the metal bromide in pulverulent form.

5. A process as set forth in claim 1, wherein the polyamide A and the concentrate differ in their viscosities by less than 1,000 poise.

6. A process as set forth in claim 1, wherein the polyamide A and the homogeneous concentrate are mixed in the solid state, then fused at from 200° to 320° C. and then processed thermoplastically.

7. A process as set forth in claim 1, wherein the mixture is processed thermoplastically to give films or sheeting.

8. A stabilized thermoplastic polyamide containing from 10 to 200 ppm of copper, in which the copper is present as copper-(I) bromide and the polyamide also contains from 0.02 to 1.0% by weight of calcium bromide.

9. A process as set forth in claim 1, wherein the polyamide A is polyhexamethylene adipamide and the polyamide B is polycaproamide.

* * * * *